US009189834B2

(12) United States Patent
Lin et al.

(10) Patent No.: US 9,189,834 B2
(45) Date of Patent: Nov. 17, 2015

(54) ADAPTIVE DENOISING WITH INTERNAL AND EXTERNAL PATCHES

(71) Applicant: Adobe Systems Incorporated, San Jose, CA (US)

(72) Inventors: Zhe Lin, Fremont, CA (US); Jianchao Yang, San Jose, CA (US); Hailin Jin, San Jose, CA (US); Xin Lu, University Park, PA (US)

(73) Assignee: Adobe Systems Incorporated, San Jose, CA (US)

( * ) Notice: Subject to any disclaimer, the term of this patent is extended or adjusted under 35 U.S.C. 154(b) by 53 days.

(21) Appl. No.: 14/080,659

(22) Filed: Nov. 14, 2013

(65) Prior Publication Data

US 2015/0131915 A1    May 14, 2015

(51) Int. Cl.
*G06K 9/56* (2006.01)
*G06T 5/00* (2006.01)
*G06K 9/46* (2006.01)

(52) U.S. Cl.
CPC .............. *G06T 5/002* (2013.01); *G06K 9/4609* (2013.01); *G06K 9/4642* (2013.01); *G06K 9/56* (2013.01); *G06T 2207/20021* (2013.01); *G06T 2207/20182* (2013.01)

(58) Field of Classification Search
CPC ................. G06T 5/002; G06T 2207/20182; G06T 5/003; G06T 11/003; G06T 3/4015; G06T 2207/20192; G06T 2207/20012; G06K 2009/4695; G06K 9/40; G06K 9/3241; G06K 9/52; G06K 9/4642
USPC ......... 382/155, 165, 205, 218, 260, 261, 266, 382/282, 299
See application file for complete search history.

(56) References Cited

U.S. PATENT DOCUMENTS

| 8,374,457 | B1* | 2/2013 | Wang et al. .................... 382/266 |
| 8,655,109 | B2* | 2/2014 | Lin et al. ....................... 382/299 |
| 2003/0161500 | A1 | 8/2003 | Blake et al. |
| 2006/0115145 | A1 | 6/2006 | Bishop et al. |
| 2007/0177817 | A1* | 8/2007 | Szeliski et al. ............... 382/275 |
| 2008/0002856 | A1 | 1/2008 | Ma et al. |
| 2011/0047163 | A1 | 2/2011 | Chechik et al. |

(Continued)

OTHER PUBLICATIONS

Buades et al., 2005 Society for Industrial and Applied Mathematics, 2005, pp. 490-530.

(Continued)

*Primary Examiner* — Barry Drennan
*Assistant Examiner* — Aklilu Woldemariam
(74) *Attorney, Agent, or Firm* — Wolfe-SBMC

(57) ABSTRACT

In techniques for adaptive denoising with internal and external patches, example image patches taken from example images are grouped into partitions of similar patches, and a partition center patch is determined for each of the partitions. An image denoising technique is applied to image patches of a noisy image to generate modified image patches, and a closest partition center patch to each of the modified image patches is determined. The image patches of the noisy image are then classified as either a common patch or a complex patch of the noisy image, where an image patch is classified based on a distance between the corresponding modified image patch and the closest partition center patch. A denoising operator can be applied to an image patch based on the classification, such as applying respective denoising operators to denoise the image patches that are classified as the common patches of the noisy image.

20 Claims, 7 Drawing Sheets

(56) References Cited

U.S. PATENT DOCUMENTS

| | | | |
|---|---|---|---|
| 2011/0097008 A1* | 4/2011 | Cao et al. | 382/260 |
| 2012/0219224 A1 | 8/2012 | Ding et al. | |
| 2012/0281923 A1* | 11/2012 | Irani et al. | 382/218 |
| 2013/0034313 A1* | 2/2013 | Lin et al. | 382/299 |
| 2013/0156340 A1* | 6/2013 | Porikli et al. | 382/275 |
| 2013/0202177 A1* | 8/2013 | Bar-Aviv et al. | 382/131 |
| 2014/0119664 A1* | 5/2014 | Ioffe et al. | 382/195 |
| 2014/0219552 A1* | 8/2014 | Porikli et al. | 382/155 |
| 2014/0301661 A1* | 10/2014 | Voronov et al. | 382/275 |
| 2015/0036943 A1* | 2/2015 | Lin | 382/264 |
| 2015/0110386 A1* | 4/2015 | Lin et al. | 382/159 |
| 2015/0139557 A1 | 5/2015 | Lin et al. | |

OTHER PUBLICATIONS

Mosseri et al.,"Combining the Power of Internal and External Denoising", In ICCP—retrieved at <<http://www.wisdom.weizmann.ac.il/~mariazon/papers/Mosseri_Zontak_Irani_ICCP2013.pdf>>, 2013, 9 pages.

Dabov et al.,"Image denoising by sparse 3D transform-domain collaborative filtering", IEEE Transactions on Image Processing, vol. 16, No. 8, Aug. 2007, 16 pages.

Burger et al.,"Image denoising: Can plain Neural Networks compete with BM3D", In CVPR—retrieved at <<http://www.is.tuebingen.mpg.de/fileadmin/user_upload/files/publications/2012/CVPR-2012-Burger.pdf>>, 2012, 8 pages.

"Pre-Interview Communication", U.S. Appl. No. 14/085,488, Jul. 30, 2015, 3 pages.

Elad, "Image Denoising via Sparse and Redundant Representations Over Learned Dictionaries", IEEE Transactions on Image Processing, vol. 15, No. 12, Dec. 2006, 10 pages.

Jain, "Data Clustering: A Review", ACM Computing Surveys, vol. 31, No. 3, Sep. 1999, 60 pages.

Soni, "Categorization of Several Clustering Algorithms from Different Perspective: A Review", International Journal of Advanced Research in Computer Science and Software Engineering, vol. 2, Issue 8, Aug. 2012, 6 pages.

* cited by examiner

ADAPTIVE DENOISING WITH INTERNAL AND EXTERNAL PATCHES

BACKGROUND

Image denoising is a challenging problem that is not readily solved. A digital image can include noise in the form of electronic noise, such as may be introduced into the image by the electronics and/or sensor of a digital camera that is used to capture the image. Another common cause of image noise is when an image is captured in low light. Much like a grainy photograph taken with a conventional camera in a low light environment, noise can appear as random specks in a digital image that has been captured with a digital camera in a low light environment. Noise may also be introduced into a digital image during image processing, such as when a compression technique is applied. Noise in a digital image reduces image detail and clarity, and is likely most notable when the image is displayed on a larger size monitor, rather than on a smaller display device that may be integrated with a digital camera, mobile phone, or other portable media device.

Conventional approaches to eliminating or reducing the noise in an image, referred to as denoising the image, leverages image priors, such as utilizing patch recurrence in an image. Patch recurrence is based on similar patches that recur in the same image (e.g., internal patches) and/or similar patches that recur in different, other images (e.g., external patches). The current techniques attempt to leverage one or the other of the two types of priors, the internal patches or the external patches. A technique that leverages the internal, similar patches in an image can still introduce artifacts or blurring effects in the image when there is not a sufficient number of self-similar patches in the image. A technique that leverages the external, similar patches does not perform well with images having only a small or limited noise because other internal patches in the image are difficult to sample and model.

SUMMARY

This Summary introduces features and concepts of adaptive denoising with internal and external patches, which is further described below in the Detailed Description and/or shown in the Figures. This Summary should not be considered to describe essential features of the claimed subject matter, nor used to determine or limit the scope of the claimed subject matter.

Adaptive denoising with internal and external patches is described. In embodiments, example image patches taken from external, example images are grouped into partitions of similar example image patches, and a partition center patch is determined for each of the partitions. A quantity of the partitions can be reduced by removing the partitions that have a lesser number of the similar example image patches. Additionally, a denoising operator can be generated for each of the partitions based on a clean-noisy patch pair developed from the partition center patch of a respective partition.

In embodiments, an image denoising technique can be applied to noisy image patches of a noisy image to generate a modified image, and modified image patches are compared to the partition center patches to determine a closest partition center patch to each of the modified image patches. The noisy image patches of the noisy image that correspond to the modified image patches of the modified image are then classified, where the noisy image patches are each classified as a common patch or as a complex patch of the noisy image.

In implementations, the modified image patches are compared to the partition center patches based on a nearest neighbor distance determination. A noisy image patch that corresponds to a modified image patch is then classified as a common patch of the noisy image based on the nearest neighbor distance of the modified image patch being within a threshold distance. Alternatively, a noisy image patch that corresponds to the modified image patch is classified as a complex patch of the noisy image based on the nearest neighbor distance of the modified image patch not being within a threshold distance.

In implementations, a denoising operator is then applied that corresponds to the closest partition center patch for each of the noisy image patches that are classified as the common patches of the noisy image to denoise the common patches. For each of the noisy image patches of the noisy image, the technique is iterative to compare respective modified image patches to the partition center patches to determine a closest partition center patch to each of the modified image patches, classify each of the noisy image patches as a common patch or as a complex patch of the noisy image, and apply respective denoising operators to the noisy image patches that are classified as the common patches of the noisy image. The common patches of the noisy image are denoised with the respective denoising operators, the complex patches of the noisy image are denoised with an internal denoising technique, and the noisy image can be reconstructed as a clean image from the denoised common patches and the denoised complex patches.

BRIEF DESCRIPTION OF THE DRAWINGS

Embodiments of adaptive denoising with internal and external patches are described with reference to the following Figures. The same numbers may be used throughout to reference like features and components that are shown in the Figures.

DETAILED DESCRIPTION

Embodiments of adaptive denoising with internal and external patches are described as a technique to generate denoising operators from external example images, distinguish common patches from complex patches in a noisy image, and adaptively denoise the complex patches of the noisy image based on internal denoising techniques while the common patches of the noisy image are denoised based on denoising operators developed from partitions of example image patches. The common patches are noisy image patches of image content that recur in the noisy image itself and/or are likely to be found as external patches in multiple external images (also referred to as the example images). The complex patches are noisy image patches of image content that are unique to the noisy image, or may recur only infrequently and are not likely to be found in the other external images. The adaptive image denoising technique adaptively utilizes both the internal (complex patches) and external (common patches) priors information to reduce or eliminate the noise in the noisy image.

While features and concepts of adaptive denoising with internal and external patches can be implemented in any number of different devices, systems, networks, environments, and/or configurations, embodiments of adaptive denoising with internal and external patches are described in the context of the following example devices, systems, and methods.

Figure 1:
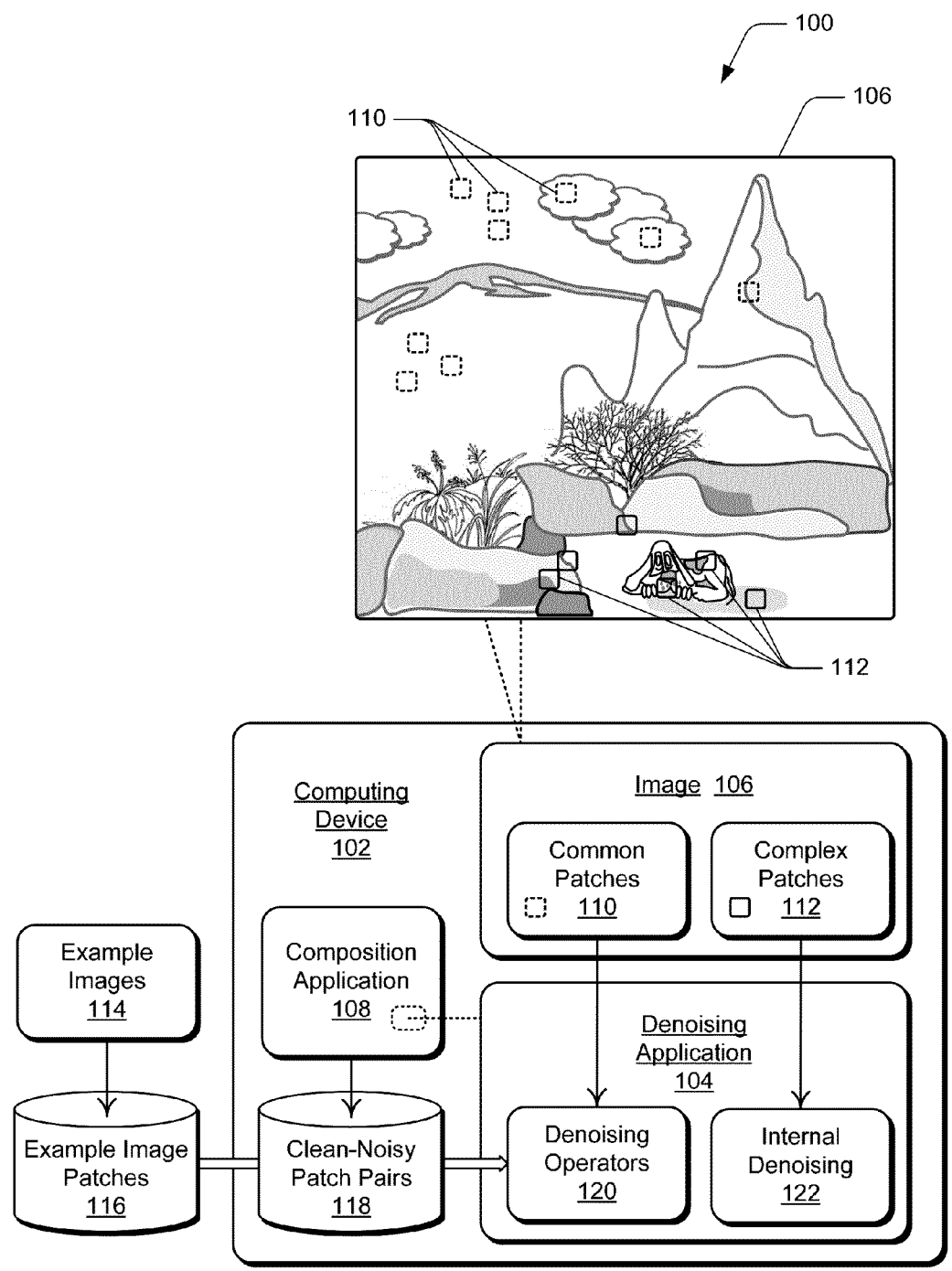
FIG. 1 illustrates an example of a device that implements a denoising application to denoise a noisy image in accordance with one or more embodiments of adaptive denoising with internal and external patches.

FIG. 1 illustrates an example 100 of a computing device 102 that implements a denoising application 104 to denoise a noisy image 106 in embodiments of adaptive denoising with internal and external patches. The noisy image 106 can be any type of a digital image, which can be displayed on a display device of a computing system or device. The image 106 can be displayed on any type of display device that is connected to, or integrated with, the computing device 102, such as any type of computer, mobile phone, tablet device, digital camera, or any other electronic media device that implements the denoising application 104 (e.g., a software application) in embodiments of adaptive denoising with internal and external patches.

In implementations, the denoising application 104 may be a module or software component of a composition application 108 (e.g., a software application) that may implement various digital image editing, processing, and composition techniques, such as related to image composition and editing, illustration editing, graphic design, and other types of image composition applications. Similarly, the denoising application 104 can be implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 7.

The noisy image 106 includes varying features, objects, and regions of the image, and as described above, a digital image may include noise (e.g., electronic noise or corruption), such as may be introduced into the image by the electronics and/or sensor of a digital camera that is used to capture the image. The effect of noise may appear as a noticeable mark or imperfection in an image, or may appear to blur most of an image. In this example, the noisy image 106 includes common patches 110 denoted by the dashed-line patches, and complex patches 112 denoted by the solid-line patches.

The common patches 110 are patches of image content that recur in multiple example images 114 and/or recur in the noisy image 106 itself. For example, the common patches 110 of the clouds, sky, and background region in the image 106 are likely to be found in many other external images, as well as recurring in the image itself. The common patches 110 are noisy image patches of the noisy image that recur as example image patches in the multiple example images. The complex patches 112 are patches of image content that are unique to the image, or may recur only infrequently in the external, example images. For example, the complex patches 112 of the rock formations, the shadows, and features of the dog are not likely to be found in other external images, and are unique to the image. The complex patches 112 that are unique to the noisy image 106 are noisy image patches of the noisy image that generally do not recur in the multiple example images.

In embodiments, the denoising application is implemented to determine the common patches 110 and the complex patches 112 of the noisy image 106, such as based on partitions of example image patches 116 as determined by the composition application 108. As described with reference to FIG. 2, the composition application 108 generates partitions of similar example image patches 116, from which clean-noisy patch pairs 118 are generated and denoising operators 120 are developed. The denoising application 104 can then denoise the common patches 110 of the noisy image 106 with the denoising operators 120, and denoise the complex patches 112 of the noisy image with internal denoising techniques 122. The complex patches 112 of the noisy image may recur in the image itself, and an internal denoising technique averages similar ones of the complex patches to denoise the complex patches of the image. The denoising application can also apply a hashing-based technique to determine self-similar patch groups of the complex patches, and denoise the complex patches of the image based on self-similarity denoising techniques.

Figure 2:
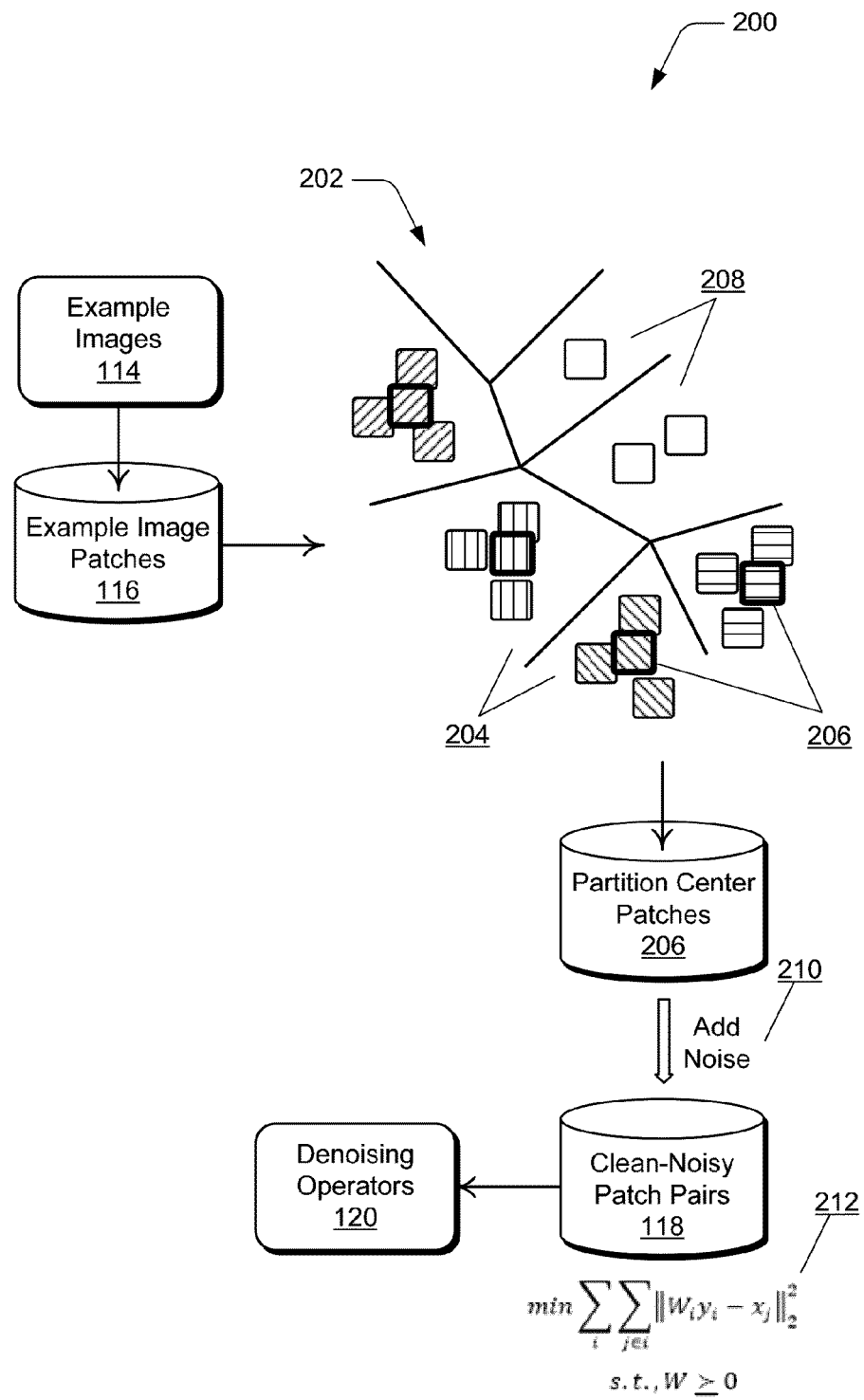
FIG. 2 illustrates an example of developing denoising operators to denoise common patches of the noisy image in accordance with one or more embodiments of adaptive denoising with internal and external patches.

FIG. 2 illustrates an example 200 described with reference to the composition application 108 that is implemented by the computing device 102 shown in FIG. 1. The composition application 108 is implemented to group the example image patches 116 taken from the example images 114 into partitions 202 of similar example image patches. For example, millions of clean patches (e.g., external sample patches that are free from noise) can be sampled from the multiple example images 114, and the composition application 108 can generate the partitions 202 of the similar example image patches 116 from the example images, which are external to the noisy image 106 that is to be denoised. The example image patches 116 are shown with different patch fill designs, such as the example image patches in the representative partitions 204. In practice, the partitions 202 of the example image patches would typically be represented as groupings of colored patches that are sectioned by the partitions. However, and merely for illustrative purposes in this example 200, the different colors of partitioned example image patches are represented by the different patch fill designs of the example image patches. In implementations, the example image patches 116 can be partitioned into the groups or clusters based on any descriptors and/or features of the example image patches.

The composition application 108 can partition a large set of the example image patches 116, such as utilizing a hierarchical k-means technique to develop the partitions 202. Additionally, the partitioning may be performed on mean-extracted patches to reduce patch complexity. In one or more implementations, relatively small patch sizes (e.g., 5×5) are used with fine-grained partitions (e.g., approximately 100,000 to 1,000,000 partitions) to ensure the patch space is sufficiently represented by a set of partition centers. The composition application 108 is also implemented to determine a partition center patch 206 for each of the partitions 202, where a partition center patch is an average and representative of the similar example image patches 116 in a respective partition. In this example 200, the partition center patches 206 are represented as the darker, bolded-line patches in each of the partitions, such as in the representative partitions 204, and a database of the partition center patches 206 is generated and maintained.

In implementations, the composition application 108 can sample the noise-free example images 114 to determine the example image patches 116. For example, the patches 116 may be randomly sampled from the collection of example images having little to no noise, which results in the collection of noise-free example image patches $\{X_i\}_{i=1}^{N}$, where "N" is the total number of sampled patches and $\{X_i\}_{i=1}^{N}$ are zero-mean patches (i.e., the sum of vector elements equals to one (1)). The composition application 108 can then form the partitions 202 that include respective subsets of the example image patches 116. For example, a large set of the partitions 202 may be used to capture variation of the example image patches taken from the example images, and each of the partitions represents a unique structure with low variance. A hierarchical k-means clustering algorithm may be used by the composition application to partition the input patch space that includes the example image patches 116.

In embodiments, the composition application 108 is implemented to reduce the quantity of the partitions 202 by removing the partitions that have a lesser number of example image patches. For example, the partitions 208 have a small number of example image patches 116, and the partitions are removed (e.g., pruned or trimmed) from the overall partitions 202. In implementations, the partitions 208 with the fewest number of patches can be removed, or alternatively, the partitions 208 can be removed based on a threshold minimum number of example image patches that are grouped into a partition.

In embodiments, the composition application 108 is also implemented to generate a denoising operator 120 for each of the partitions 202 based on a clean-noisy patch pair 118 that is developed from the partition center patch 206 of a respective partition. For example, the composition application can add noise at 210 to a partition patch center 206 to generate a corresponding clean-noisy patch pair 118, from which a respective denoising operator 120 is developed.

The composition application 108 learns the denoising operators 120 on each of the partitions 202 of the example image patches. For each of the partitions 202, the clean partition center patches 206 that are without noise are determined and synthetic noise is added at 210 to generate the clean-noisy patch pairs 118. The composition application 108 is implemented to then train non-negative linear regressors based on the equation 212 below as the denoising operator for each partition:

$$\min \sum_i \sum_{j \in i} \|W_i y_i - x_j\|_2^2$$

s.t., $$W \succ 0$$

where W is the learned denoising operator for each partition 202 based on a "y" noisy patch and predicted "x" output of a clean patch without noise. A denoising operator 120 is a function of a partition center patch 206, and the corresponding denoising operator can be applied to any of the similar example image patches 116 in a respective partition 202. The partition center patches 206 and the denoising operators 120 are saved, and can be utilized by the denoising application 104 to denoise the common patches 110 of the noisy image 106, as described further with reference to FIGS. 4 and 5.

Example methods 300 and 500 are described with reference to respective FIGS. 3 and 5 in accordance with one or more embodiments of adaptive denoising with internal and external patches. Generally, any of the services, components, modules, methods, and operations described herein can be implemented using software, firmware, hardware (e.g., fixed logic circuitry), manual processing, or any combination thereof. The example method may be described in the general context of executable instructions stored on a computer-readable storage memory that is local and/or remote to a computer processing system, and implementations can include software applications, programs, functions, and the like.

Figure 3:
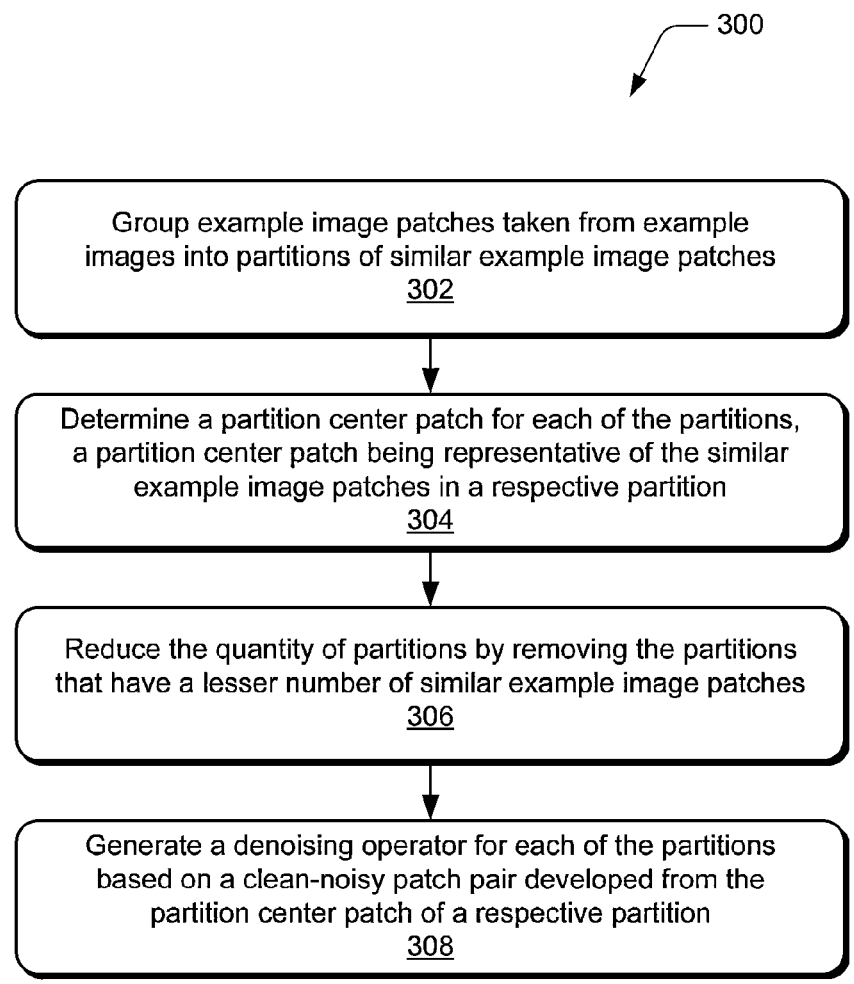
FIG. 3 illustrates example method(s) of adaptive denoising with internal and external patches in accordance with one or more embodiments.

FIG. 3 illustrates example method(s) 300 of adaptive denoising with internal and external patches, and is generally described with reference to a composition application implemented by a computing device. The order in which the method is described is not intended to be construed as a limitation, and any number or combination of the method operations can be combined in any order to implement a method, or an alternate method.

At 302, example image patches taken from example images are grouped into partitions of similar example image patches. For example, the composition application 108 (FIG. 1) that is implemented by the computing device 102 (or implemented at a cloud-based data service as described with reference to FIG. 6) groups the example image patches 116 that are taken from the example images 114 into the partitions 202 of similar example image patches.

At 304, a partition center patch is determined for each of the partitions, where a partition center patch is representative of the similar example image patches in a respective partition. For example, the composition application 108 determines the partition center patches 206 for each of the partitions 202, where a partition center patch 206 is representative of the similar example image patches 116 in a respective partition.

At 306, the quantity of the partitions is reduced by removing the partitions that have a lesser number of similar example image patches. For example, the composition application 108 reduces the quantity of the partitions 202 by removing the partitions 208 that have a lesser number of example image patches. In implementations, the partitions 208 with the fewest number of patches can be removed, or alternatively, the partitions 208 can be removed based on a threshold minimum number of example image patches that are grouped into a partition.

At 308, a denoising operator is generated for each of the partitions based on a clean-noisy patch pair that is developed from the partition center patch of a respective partition. For example, the composition application 108 generates the denoising operators 120 for each of the partitions 202 based on the clean-noisy patch pairs 118 that are developed from the respective partition center patches 206 of each partition. The composition application adds the noise at 210 to a partition patch center 206 to generate a corresponding clean-noisy patch pair 118, from which a respective denoising operator 120 is developed.

Figure 4:
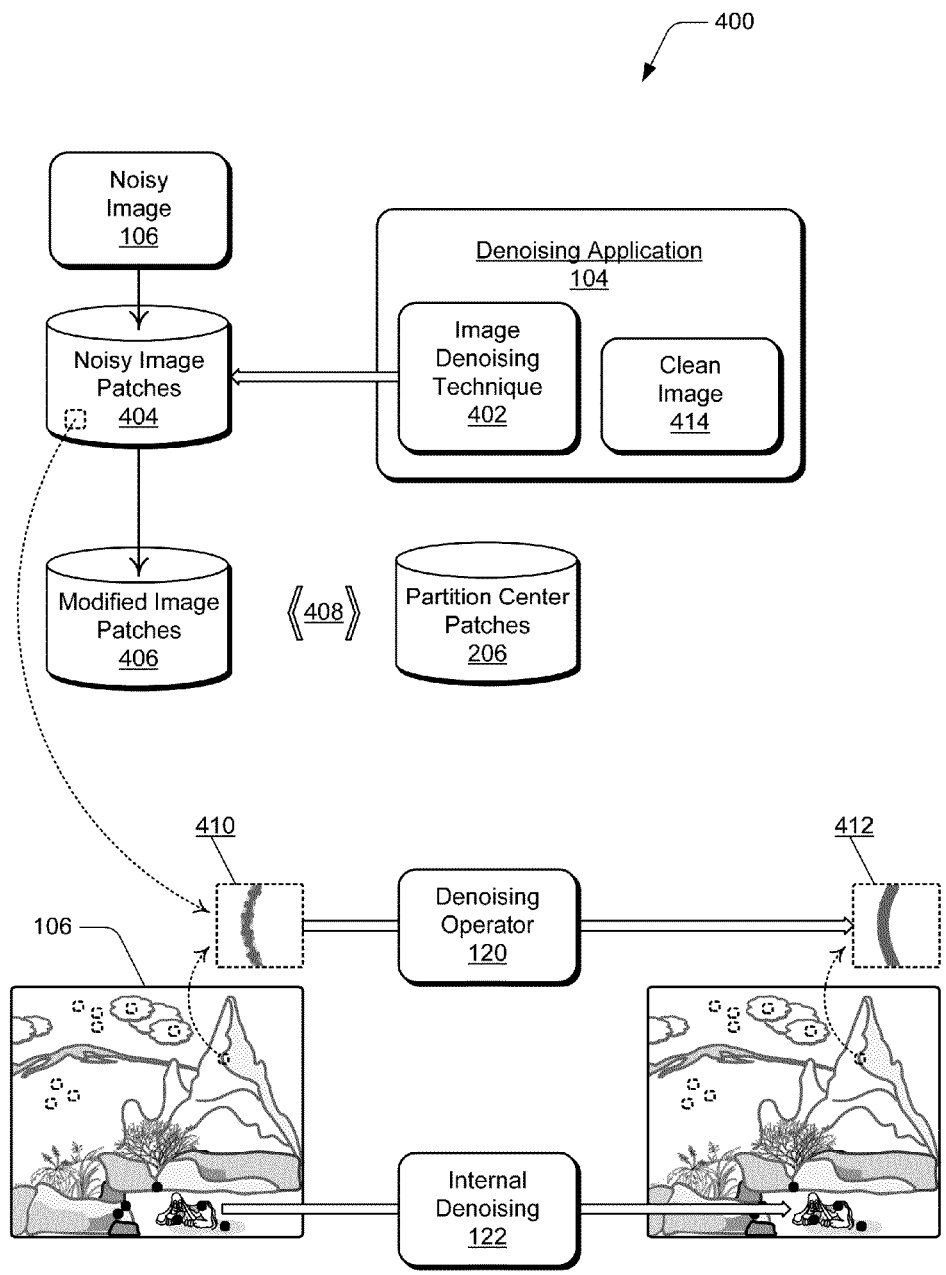
FIG. 4 illustrates an example of denoising the noisy image patches of the noisy image in accordance with one or more embodiments of adaptive denoising with internal and external patches.

FIG. 4 illustrates an example 400 of denoising the noisy image patches (e.g., the common patches 110 and the complex patches 112) of the noisy image 106 in embodiments of adaptive denoising with internal and external patches. Given the noisy image 106, the denoising application 104 is implemented to initially apply an image denoising technique 402 to the patches 404 of the noisy image to generate a modified image having modified image patches 406. The denoising application 104 can utilize any type of basic, single image denoising technique, such as non-local means, to initially remove some noise from the patches 404 of the noisy image 106. Additionally, self-similarity may be used to compute the initial denoising result for the noisy image patches of the noisy image.

The denoising application 104 is implemented to then compare (at 408) each of the modified image patches 406 to the partition center patches 206 to determine a closest partition center patch to a modified image patch. The denoising application 104 can compare a modified image patch 406 to the partition center patches 206 based on a nearest neighbor distance determination to find the nearest neighbor distance between the modified image patch 406 and a partition center patch. The denoising application 104 can then classify a noisy image patch 404 of the noisy image 106 that corresponds to a modified image patch 406 as a common patch 110 or as a complex patch 112 of the noisy image.

For example, a noisy image patch 404 that corresponds to a modified image patch 406 can be classified as a common patch 110 of the noisy image 106 based on the nearest neighbor distance of the modified image patch 406 being within a threshold distance of a partition center patch 206. Alternatively, a noisy image patch 404 that corresponds to the modified image patch 406 can be classified as a complex patch 112 of the noisy image 106 based on the nearest neighbor distance of the modified image patch 406 not being within the threshold distance of the partition center patch 206.

Then, for a noisy image patch 410, which is one of the noisy image patches 404 and has been classified as a common patch, the denoising application 104 can apply the denoising operator 120 that corresponds to the closest partition center patch 206 to the noisy image patch that is classified as the common patch of the noisy image. The noisy image patch 410 may also be referred to as a noisy common patch of the noisy image 106, and based on the corresponding modified image patch being within the threshold distance of the partition center patch, the denoising application 104 applies the associated denoising operator 120 to generate a denoised-version 412 of the noisy common patch 410. Thus, each of the noisy image patches 404 that are classified as the common patches 110 of the noisy image are denoised with the respective denoising operators 120. The noisy image patches 404 that are classified as the complex patches 112 of the noisy image are denoised with the internal denoising techniques 122, such as using patch average, non-local means, or a similar patch-based method. The entire noisy image 106 can then be reconstructed as a clean image 414 from the denoised common patches and the denoised complex patches by the adaptive denoising technique.

Figure 5:
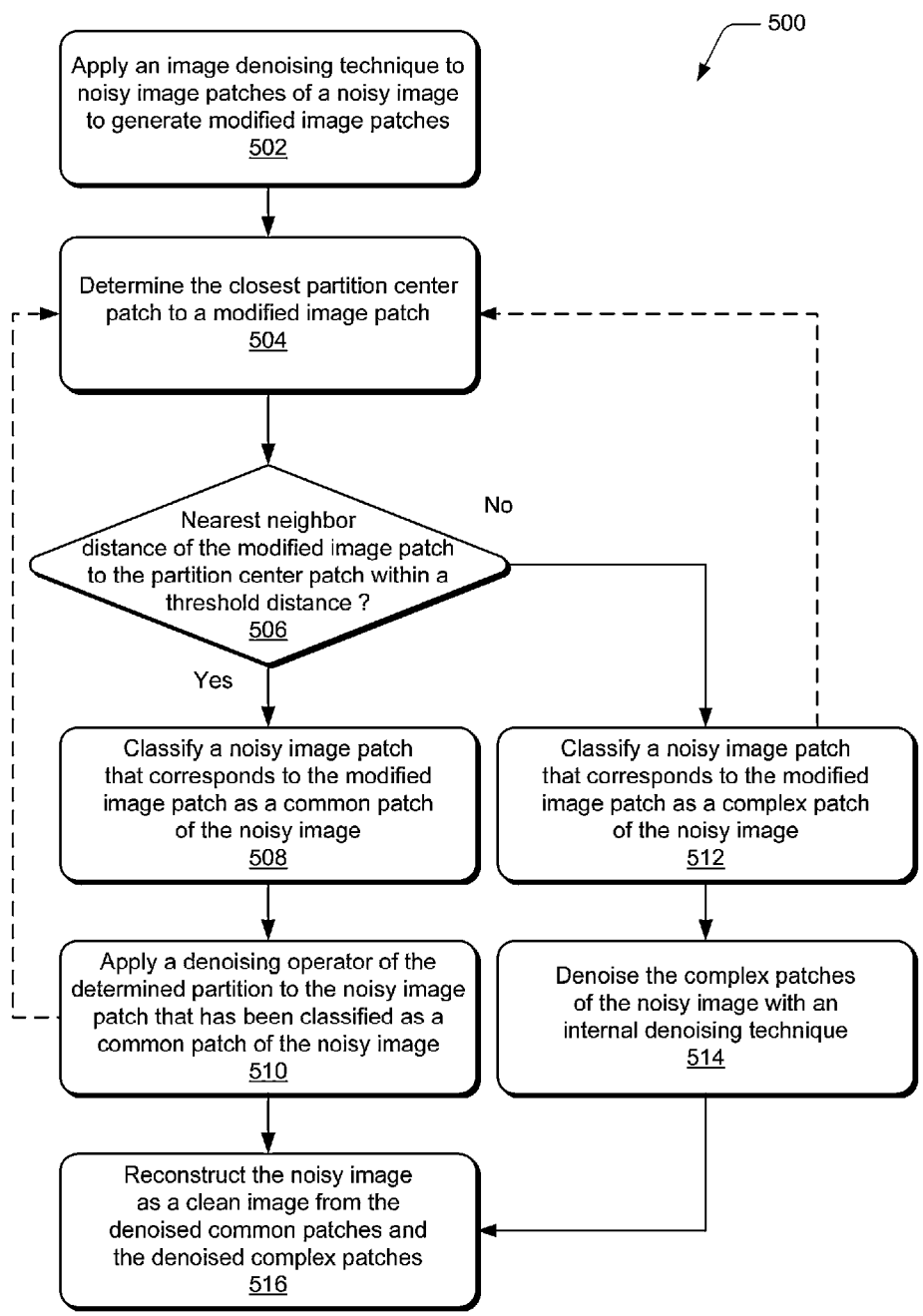
FIG. 5 illustrates example method(s) of adaptive denoising with internal and external patches in accordance with one or more embodiments.

FIG. 5 illustrates example method(s) 500 of adaptive denoising with internal and external patches, and is generally described with reference to a denoising application implemented by a computing device. The order in which the method is described is not intended to be construed as a limitation, and any number or combination of the method operations can be combined in any order to implement a method, or an alternate method.

At 502, an image denoising technique is applied to noisy image patches of a noisy image to generate modified image patches. For example, the denoising application 104 (FIG. 1) that is implemented by the computing device 102 (or implemented at a cloud-based data service as described with reference to FIG. 6) applies a basic, single image denoising technique 402 to initially remove some noise from the patches 404 of the noisy image 106, and generates the modified image patches 406.

At 504, a partition center patch that is closest to a modified image patch is determined from the partitions of the similar example image patches. For example, the denoising application 104 determines a closest partition center patch 206 to each of the modified image patches 406. The denoising application 104 can determine the closest partition center patches 206 based on a nearest neighbor distance determination to find the nearest neighbor distance between a modified image patch 406 and a partition center patch.

At 506, a determination is made as to whether a nearest neighbor distance of the modified image patch to the partition center patch is within a threshold distance. For example, the denoising application 104 determines whether the nearest neighbor distance of the modified image patch 406 to a partition center patch 206 is within a threshold distance. If the nearest neighbor distance of the modified image patch 406 to the partition center patch 206 is within the threshold distance (i.e., "yes" from 506), then at 508, the noisy image patch of the noisy image that corresponds to the modified image patch of the modified image is classified as a common patch of the noisy image. For example, the denoising application 104 classifies a noisy image patch 404 that corresponds to a modified image patch 406 as a common patch 110 of the noisy image 106 based on the nearest neighbor distance of the modified image patch 406 being within the threshold distance of a partition center patch 206.

At 510, a denoising operator of the determined partition is applied to the noisy image patch that has been classified as a common patch of the noisy image. For example, the denoising application 104 applies the denoising operator 120 that corresponds to the closest partition center patch 206 to the noisy image patch 410 that is classified as the common patch of the noisy image (e.g., a noisy common patch of the noisy image 106).

If the nearest neighbor distance of the modified image patch to the partition center patch is not within the threshold distance (i.e., "no" from 506), then at 512, the noisy image patch of the noisy image that corresponds to the modified image patch of the modified image is classified as a complex patch of the noisy image. For example, the denoising application 104 classifies a noisy image patch 404 that corresponds to the modified image patch 406 as a complex patch 112 of the noisy image 106 based on the nearest neighbor distance of the modified image patch 406 not being within the threshold distance of the partition center patch 206. The described technique is iterative for each noisy image patch 404 of the noisy image 106, and the method continues to determine the closest partition center patches 206 to subsequent modified image patches 406 at 504; determine whether the nearest neighbor distance of a modified image patch 406 is within the threshold distance to a determined partition center patch 206 at 506; and classify the corresponding noisy image patch 410 as a common patch at 508 or as a complex patch at 512.

At 514, the complex patches of the noisy image are denoised with an internal denoising technique. For example, the denoising application 104 applies the internal denoising techniques 122 to denoise the complex patches 112 of the noisy image 106. The complex patches of the image recur in the image itself, and the internal denoising averages similar ones of the complex patches to denoise the complex patches of the image, such as by applying a hashing-based technique to generate self-similar patch groups of the complex patches, and denoise the complex patches of the image based on self-similarity denoising techniques. At 516, the noisy image is reconstructed as a clean image from the denoised common patches and the denoised complex patches. For example, the denoising application 104 reconstructs the entire noisy image 106 as the clean image 414 from the denoised common patches and the denoised complex patches by the adaptive denoising technique.

Figure 6:
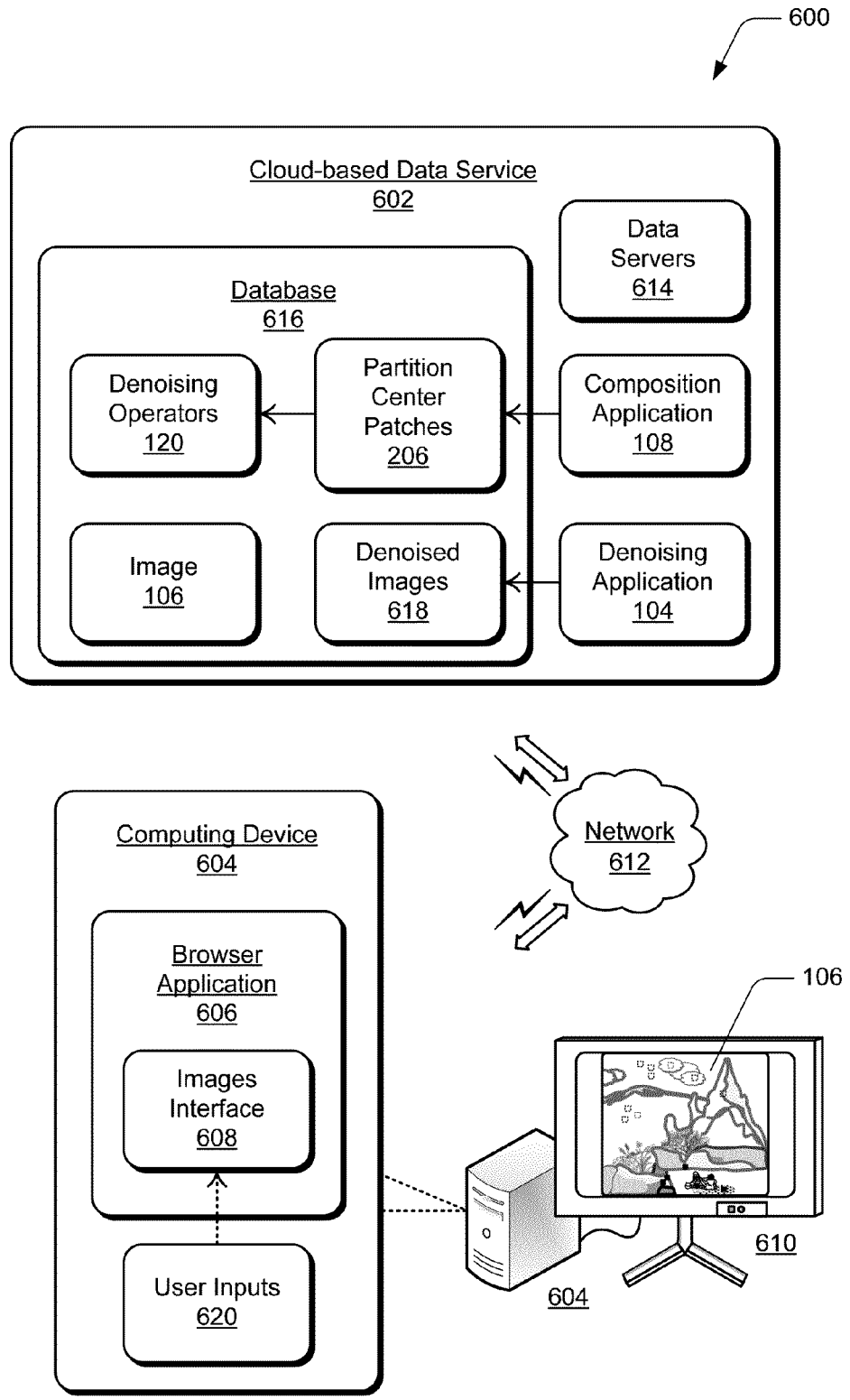
FIG. 6 illustrates an example system in which embodiments of adaptive denoising with internal and external patches can be implemented.

FIG. 6 illustrates an example system 600 in which embodiments of adaptive denoising with internal and external patches can be implemented. The example system 600 includes a cloud-based data service 602 that a user can access via a computing device 604, such as any type of computer, mobile phone, tablet device, and/or other type of computing device. The computing device 604 can be implemented with a browser application 606 through which a user can access the data service 602 and initiate a display of an images interface 608 to display images, such as the image 106 also shown on a display device 610 that is connected to the computing device. The computing device 604 can be implemented with various components, such as a processing system and memory, and with any number and combination of differing components as further described with reference to the example device shown in FIG. 7.

In embodiments of adaptive denoising with internal and external patches, the cloud-based data service 602 is an example of a network service that provides an on-line, Web-based version of the denoising application 104 that a user can log into from the computing device 604 and display the images interface 608. The network service may be utilized for any type of image editing and processing, to include illustration editing, video compositing and editing, graphics and page layouts, animation, and any other type of application user interface. The data service can also maintain and/or upload the image 106 that is displayable in the images interface 608.

Any of the devices, data servers, and networked services described herein can communicate via a network 612, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 602 includes data servers 614 that may be implemented as any suitable memory, memory device, or electronic data storage for network-based data storage, and the data servers communicate data to computing devices via the network 612. The data servers 614 maintain a database 616 of the user images (e.g., the image 106), as well as denoised images 618 that are generated by the denoising application 104. The database 616 can also include the partition center patches 206 and the denoising operators 120 that are generated by the composition application 108 and utilized by the denoising application 104 to adaptively denoise the common patches 110 of the noisy image 106.

The cloud-based data service 602 includes the denoising application 104 and the composition application 108, such as software applications (e.g., executable instructions) that are executable with a processing system to implement embodiments of adaptive denoising with internal and external patches. The denoising application 104 and the composition application 108 can be stored on a computer-readable storage memory, such as any suitable memory, storage device, or electronic data storage implemented by the data servers 614. Further, the data service 602 can include any server devices and applications, and can be implemented with various components, such as a processing system and memory, as well as with any number and combination of differing components as further described with reference to the example device shown in FIG. 7.

The data service 602 communicates images data and the images interface 608 of the denoising application 104 to the computing device 604 where the images interface is displayed, such as through the browser application 606 and displayed on the display device 610 of the computing device. The denoising application 104 can also receive user inputs 620 to the images interface 608, such as when a user at the computing device 604 initiates a user input with a computer input device or as a touch input on a touchscreen to initiate denoising an image. The computing device 604 communicates the user inputs 620 to the data service 602 via the network 612, where the denoising application 104 receives the user inputs.

Figure 7:
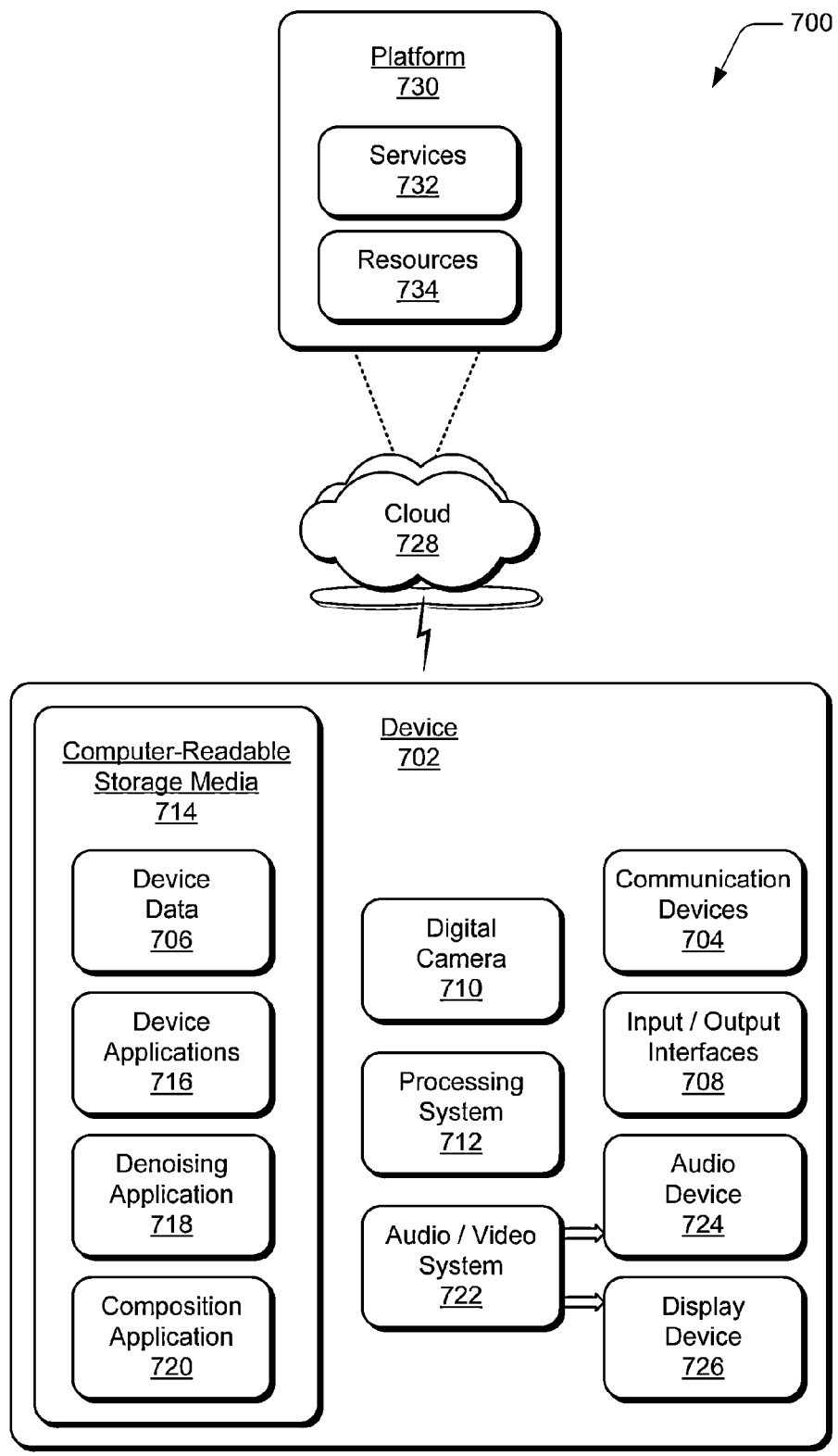
FIG. 7 illustrates an example system with an example device that can implement embodiments of adaptive denoising with internal and external patches.

FIG. 7 illustrates an example system 700 that includes an example device 702, which can implement embodiments of adaptive denoising with internal and external patches. The example device 702 can be implemented as any of the devices and/or server devices described with reference to the previous FIGS. 1-6, such as any type of client device, mobile phone, tablet, computing, communication, entertainment, gaming, media playback, digital camera, and/or other type of device. For example, the computing device 102 shown in FIG. 1, as well as the computing device 604 and the data service 602 (and any devices and data servers of the data service) shown in FIG. 6 may be implemented as the example device 702.

The device 702 includes communication devices 704 that enable wired and/or wireless communication of device data 706, such as user images and other associated image data. The device data can include any type of audio, video, and/or image data, as well as the images and denoised images. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device 710 and/or display device that may be integrated with the device 702. The I/O interfaces also include data input ports via which any type of data, media content, and/or inputs can be received, such as user inputs to the device, as well as any type of audio, video, and/or image data received from any content and/or data source.

The device 702 includes a processing system 712 that may be implemented at least partially in hardware, such as with any type of microprocessors, controllers, and the like that process executable instructions. The processing system can include components of an integrated circuit, programmable logic device, a logic device formed using one or more semi-conductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage media 714, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 714 provides storage of the device data 706 and various device applications 716, such as an operating system that is maintained as a software application with the computer-readable storage media and executed by the processing system 712. In this example, the device applications also include a denoising application 718 and/or a composition application 720 that implement embodiments of adaptive denoising with internal and external patches, such as when the example device 702 is implemented as the computing device 102 shown in FIG. 1 or the data service 602 shown in FIG. 6. An example of the denoising application 718 includes the denoising application 104 implemented by the computing device 102 and/or at the data service 602, and an example of the composition application 720 includes the composition application 108 implemented by the computing device 102 and/or at the data service 602, as described in the previous FIGS. 1-6.

The device 702 also includes an audio and/or video system 722 that generates audio data for an audio device 724 and/or generates display data for a display device 726. The audio device and/or the display device include any devices that process, display, and/or otherwise render audio, video, display, and/or image data, such as the image content of a digital photo. In implementations, the audio device and/or the display device are integrated components of the example device 702. Alternatively, the audio device and/or the display device are external, peripheral components to the example device.

In embodiments, at least part of the techniques described for adaptive denoising with internal and external patches may be implemented in a distributed system, such as over a "cloud" 728 in a platform 730. The cloud 728 includes and/or is representative of the platform 730 for services 732 and/or resources 734. For example, the services 732 may include the data service 602 as described with reference to FIG. 6. Additionally, the resources 734 may include the denoising application 104 and/or the composition application 108 that are implemented at the data service as described with reference to FIG. 6.

The platform 730 abstracts underlying functionality of hardware, such as server devices (e.g., included in the services 732) and/or software resources (e.g., included as the resources 734), and connects the example device 702 with other devices, servers, etc. The resources 734 may also include applications and/or data that can be utilized while computer processing is executed on servers that are remote from the example device 702. Additionally, the services 732 and/or the resources 734 may facilitate subscriber network services, such as over the Internet, a cellular network, or Wi-Fi network. The platform 730 may also serve to abstract and scale resources to service a demand for the resources 734 that are implemented via the platform, such as in an interconnected device embodiment with functionality distributed throughout the system 700. For example, the functionality may be implemented in part at the example device 702 as well as via the platform 730 that abstracts the functionality of the cloud 728.

Although embodiments of adaptive denoising with internal and external patches have been described in language specific to features and/or methods, the appended claims are not necessarily limited to the specific features or methods described. Rather, the specific features and methods are disclosed as example implementations of adaptive denoising with internal and external patches.

The invention claimed is:

1. A method, comprising:
applying an image denoising technique to an image patch of a noisy image to generate a modified image patch;
determining, from partitions of example image patches that are sampled from example images, a closest partition center patch to the modified image patch, the example image patches in a partition being similar, one example image patch to another, and including a partition center patch that is determined to represent the example image patches of the partition;
classifying the image patch of the noisy image as a common patch or as a complex patch of the noisy image, said classifying based on a distance between the modified image patch and the closest partition center patch; and
applying a denoising operator to the image patch based on the classification.

2. The method as recited in claim 1, further comprising:
grouping the example image patches sampled from the example images into the partitions of the similar example image patches;
reducing a quantity of the partitions by removing the partitions that have a lesser number of the similar example image patches; and
determining the partition center patch for each of the partitions.

3. The method as recited in claim 1, further comprising:
generating the denoising operator for each of the partitions of similar example image patches based on a clean-noisy patch pair developed from the partition center patch of a respective partition; and
said applying the denoising operator based on the image patch being classified as the common patch.

4. The method as recited in claim 1, further comprising:
said determining the closest partition center patch to the modified image patch based on a nearest neighbor distance determination.

5. The method as recited in claim 4, further comprising:
said classifying the image patch that corresponds to the modified image patch as the common patch of the noisy image based on the nearest neighbor distance of the modified image patch being within a threshold distance.

6. The method as recited in claim 4, further comprising:
said classifying the image patch that corresponds to the modified image patch as the complex patch of the noisy image based on the nearest neighbor distance of the modified image patch not being within a threshold distance.

7. The method as recited in claim 1, further comprising:
iterating, for multiple modified image patches of the noisy image:
said determining the closest partition center patch to each of the modified image patches;
said classifying image patches that each correspond to one of the modified image patches as a common patch or as a complex patch of the noisy image; and
said applying respective denoising operators to the image patches that are classified as a common patch of the noisy image.

8. The method as recited in claim 1, further comprising:
denoising common patches of the noisy image with respective denoising operators;
denoising complex patches of the noisy image with an internal denoising technique; and
reconstructing the noisy image as a clean image from the denoised common patches and the denoised complex patches.

9. The method as recited in claim 8, wherein:
the complex patches of the noisy image recur in the noisy image itself; and
the internal denoising technique averages similar ones of the complex patches to denoise the complex patches of the noisy image.

10. A computing device, comprising:
a memory configured to maintain a noisy image;
a processor to implement one or more applications that are configured to:
apply an image denoising technique to image patches of the noisy image to generate modified image patches in which at least some noise of the noisy image is removed;
determine a closest partition center patch to each of the modified image patches from partitions of similar example image patches;
classify each of the image patches of the noisy image as a common patch or as a complex patch of the noisy image, the image patches each classified based on a distance between a corresponding modified image patch and the closest partition center patch; and
apply a denoising operator to each of the image patches based on the classification, the denoising operator applied to an image patch being learned, in part, by adding synthetic noise to the partition center patch that is determined for a modified image patch that corresponds to the image patch.

11. The computing device as recited in claim 10, wherein the one or more applications are configured to:
group example image patches taken from example images into the partitions of the similar example image patches;
reduce a quantity of the partitions by removing the partitions that have a lesser number of the similar example image patches; and
determine a partition center patch for each of the partitions, the partition center patch of a partition being representative of the similar example image patches in a respective partition.

12. The computing device as recited in claim 10, wherein the one or more applications are configured to:
generate the denoising operator for each of the partitions of similar example image patches based on a clean-noisy patch pair developed from the partition center patch of a respective partition; and
apply the denoising operator based on an image patch being classified as the common patch.

13. The computing device as recited in claim 10, wherein the one or more applications are configured to:
said determine the closest partition center patch to each of the modified image patches based on a nearest neighbor distance determination; and
classify an image patch that corresponds to a modified image patch as the common patch of the noisy image based on the nearest neighbor distance of the modified image patch being within a threshold distance.

14. The computing device as recited in claim 10, wherein the one or more applications are configured to:
said determine the closest partition center patch to each of the modified image patches based on a nearest neighbor distance determination; and
classify an image patch that corresponds to a modified image patch as the complex patch of the noisy image based on the nearest neighbor distance of the modified image patch not being within a threshold distance.

15. The computing device as recited in claim 10, wherein the one or more applications are configured to:
denoise the common patches of the noisy image with respective denoising operators;
denoise the complex patches of the noisy image with an internal denoising technique; and
reconstruct the noisy image as a clean image from the denoised common patches and the denoised complex patches.

16. A method, comprising:
grouping example image patches taken from example images into partitions of similar example image patches;
determining a partition center patch for each of the partitions, the partition center patch being representative of the similar example image patches in a respective partition;
reducing a quantity of the partitions by removing the partitions that have a lesser number of the similar example image patches; and
generating a denoising operator for each of the partitions according to a learning technique that generates a clean-noisy patch pair, in part, by adding synthetic noise to the partition center patch of a respective partition.

17. The method as recited in claim 16, further comprising:
applying an image denoising technique to image patches of a noisy image to generate modified image patches in which at least some noise of the noisy image is initially removed;
determining a closest partition center patch to a modified image patch;
classifying an image patch of the noisy image as a common patch or as a complex patch of the noisy image, said classifying based on a distance between the modified image patch and the closest partition center patch; and
applying the denoising operator that corresponds to the closest partition center patch to the image patch that is classified as the common patch of the noisy image.

18. The method as recited in claim 17, further comprising:
said determining the closest partition center patch to the modified image patch based on a nearest neighbor distance determination; and
said classifying the image patch that corresponds to the modified image patch as the common patch of the noisy image based on the nearest neighbor distance of the modified image patch being within a threshold distance.

19. The method as recited in claim 17, further comprising
said determining the closest partition center patch to the modified image patch based on a nearest neighbor distance determination; and
said classifying the image patch that corresponds to the modified image patch as the complex patch of the noisy image based on the nearest neighbor distance of the modified image patch not being within a threshold distance.

20. The method as recited in claim 17, further comprising iterating, for each of the image patches of the noisy image:
said determining the closest partition center patch to each of the modified image patches to the partition center patches;

said classifying each of the image patches as a common patch or as a complex patch of the noisy image; and said applying respective denoising operators to the image patches that are classified as a common patch of the noisy image.

\* \* \* \* \*